(12) United States Patent
Hansen et al.

(10) Patent No.: US 11,773,821 B2
(45) Date of Patent: Oct. 3, 2023

(54) METHOD OF ASSEMBLING A WIND TURBINE BLADE

(71) Applicant: LM Wind Power A/S, Kolding (DK)

(72) Inventors: Peter Hansen, Kolding (DK); Hans Minnee, DH Heerhugowaard (NL)

(73) Assignee: LM Wind Power A/S, Kolding (DK)

( * ) Notice: Subject to any disclaimer, the term of this patent is extended or adjusted under 35 U.S.C. 154(b) by 0 days.

(21) Appl. No.: 17/678,231

(22) Filed: Feb. 23, 2022

(65) Prior Publication Data

US 2022/0268254 A1 Aug. 25, 2022

(30) Foreign Application Priority Data

Feb. 24, 2021 (EP) ..................................... 21158948

(51) Int. Cl.
| | |
|---|---|
| *F03D 1/06* | (2006.01) |
| *F03D 13/10* | (2016.01) |
| *B29L 31/08* | (2006.01) |

(52) U.S. Cl.
CPC ........... *F03D 1/0675* (2013.01); *F03D 13/10* (2016.05); *B29L 2031/085* (2013.01); *F05B 2230/604* (2013.01); *F05B 2240/302* (2013.01)

(58) Field of Classification Search
CPC .. F03D 1/0675; F03D 13/10; F05B 2230/604; F05B 2240/302
See application file for complete search history.

(56) References Cited

U.S. PATENT DOCUMENTS

| 7,473,385 B2 | 1/2009 | Stiesdal et al. | |
|---|---|---|---|
| 7,740,453 B2* | 6/2010 | Zirin | F03D 1/0675 |
| | | | 416/233 |
| 7,922,454 B1* | 4/2011 | Riddell | F03D 1/0675 |
| | | | 416/224 |
| 8,007,624 B2 | 8/2011 | Stiesdal | |
| 8,167,569 B2* | 5/2012 | Livingston | F03D 1/0675 |
| | | | 416/224 |
| 8,221,085 B2* | 7/2012 | Livingston | B29C 65/483 |
| | | | 156/304.3 |
| 8,356,982 B2* | 1/2013 | Petri Larrea | F03D 1/0675 |
| | | | 403/DIG. 15 |

(Continued)

FOREIGN PATENT DOCUMENTS

| JP | 2020176538 A | * 10/2020 |
|---|---|---|
| JP | 2020176538 A | 10/2020 |

OTHER PUBLICATIONS

European Search Report Corresponding to EP21158948.6 dated Aug. 17, 2021.

*Primary Examiner* — Brian P Wolcott
(74) *Attorney, Agent, or Firm* — Dority & Manning, P.A.

(57) ABSTRACT

A method for assembling a component, such as a wind turbine blade, includes providing a first element of the component and providing a second element of the component. An alignment member is inserted at a predefined position in one of the first or second elements, the alignment member having a predefined shape. The alignment member is positioned within a receiver portion of the other of the first or second elements along a joining portion, and the first and second elements are then joined. During the joining process, the alignment member aligns along a longitudinal axis of at least one of the first or second elements.

12 Claims, 5 Drawing Sheets

(56) References Cited

U.S. PATENT DOCUMENTS

Figure 1:
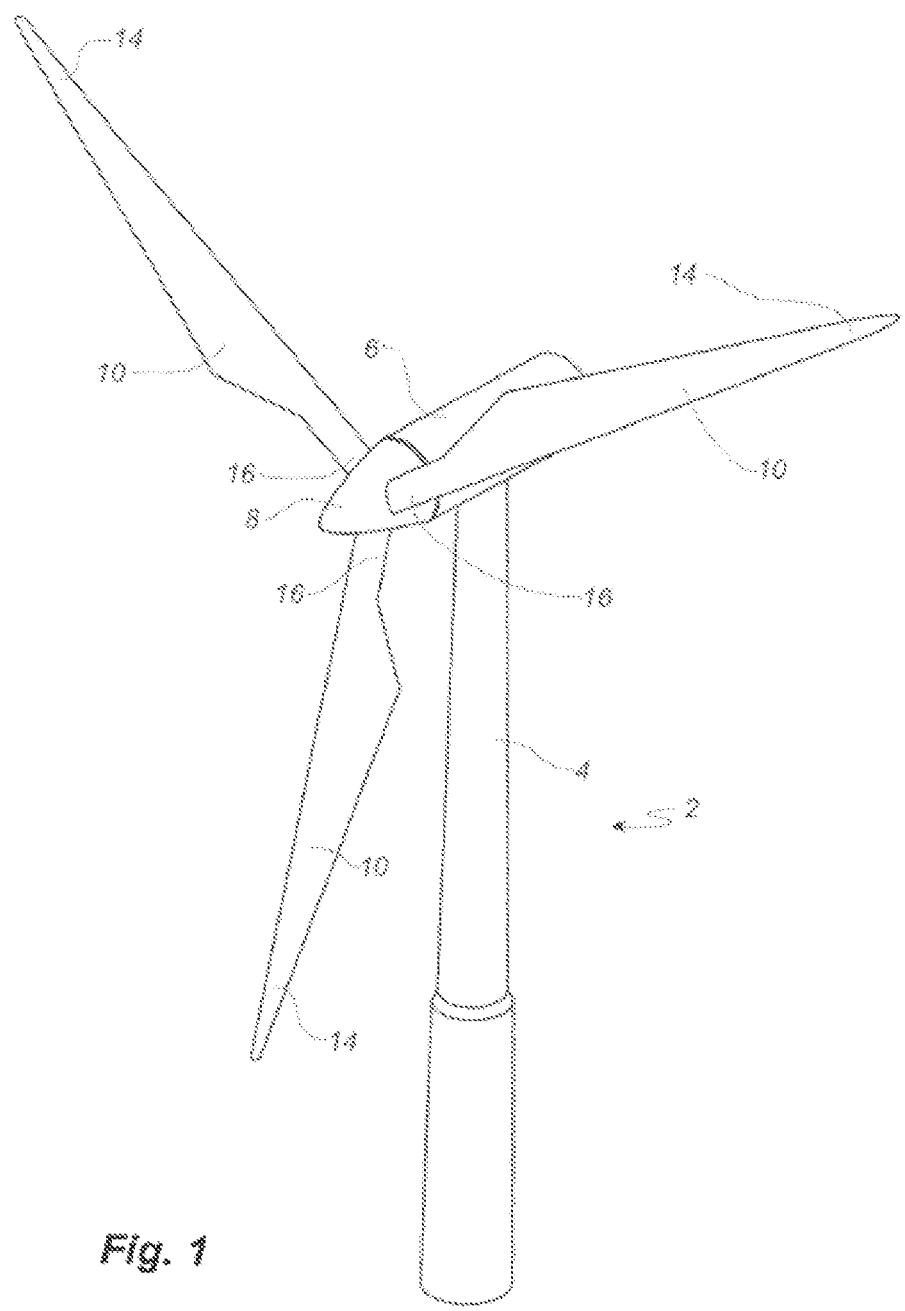

| | | | |
|---|---|---|---|
| 8,764,401 B2 * | 7/2014 | Hayden | F03D 1/0633 |
| | | | 416/224 |
| 9,050,786 B2 * | 6/2015 | Fredskild | B29C 70/304 |
| 10,451,030 B2 * | 10/2019 | Hayden | B29C 70/00 |
| 10,677,215 B2 * | 6/2020 | Hayden | B29C 70/342 |
| 2009/0162208 A1 | 6/2009 | Zirin et al. | |
| 2011/0020129 A1 * | 1/2011 | Petri Larrea | F03D 1/0675 |
| | | | 416/223 R |
| 2011/0158788 A1 * | 6/2011 | Bech | F03D 1/0683 |
| | | | 29/889.7 |
| 2016/0369771 A1 | 12/2016 | Feigl | |

* cited by examiner

METHOD OF ASSEMBLING A WIND TURBINE BLADE

FIELD OF THE INVENTION

The present invention relates to a wind turbine blade. Particularly but not exclusively, the disclosure discloses about the method of assembling the wind turbine blade. Further, embodiments of the present invention disclose assembly of root end and tip end elements of the wind turbine blade using members or beams of pre-defined shape.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy to turn a shaft coupling the rotor blades to a gearbox, or if a gearbox is not used, directly to the generator. The generator then converts the mechanical energy to electrical energy that may be deployed to a utility grid.

Wind turbine blades usually comprise two half shells of fibre reinforced resin moulded in two open moulds, one for each half shell, the half shells being joined with adhesive at the leading and trailing edges of the blade substantially along the full length of the blade. Alternatively, a wind turbine blade may also be made according to a one-shot method, where the full blade is infused with resin in a closed mould, as described in, for example, EP 1 310 351 and EP 2 116 359. This one-shot process omits the adhesive joints at the leading- and trailing edges of the blade but is more complicated to practice than the process involving half shells.

Modern wind turbine blades are typically over 40 meters long, and recently, blades close to 90 meters have been launched. It is expected that the development of even longer blades will contribute to reduce the cost of energy, especially in the offshore wind industry.

Accordingly, it has been suggested to assemble wind turbine blades from shorter blade elements. The assembly of these elements can then be done at a facility close to the site where the wind turbine blade is erected or at least close to a harbor, minimizing or eliminating road or rail transport of the long wind turbine blade. It may be easier and less costly to transport shorter blade elements.

US 2016/0369771 discloses blade modules for a wind turbine blade designed to be coupled via protruding spar cap segments. A combination of spar cap segments and brackets 30 for joining wind turbine blades are disclosed in US 2009/0162208.

WO 2012/019888 discloses a method of manufacturing two wind turbine shell parts which can later be joined to form a wind turbine blade shell.

EP 2 418 072 A 1 relates to a method of moulding different sections of a wind turbine blade by arranging a fibre lay-up in a first longitudinal section of a mould, placing a polymer foil over an edge area of the fibre lay-up, and placing another fibre lay-up in another section of the mould such that the lay-ups overlap. The area of overlap between the fibre lay-ups may taper gradually.

DE 10 2008 055 513 A 1 relates to a system for assembling a wind turbine blade by providing two segments which are glued together. The segments may have tapered geometries.

There is a continuing need for robust methods for assembling wind turbine blades from blade elements, in particular because blade parts are typically fairly long and flexible, creating challenges in their correct alignment and joining.

SUMMARY OF THE INVENTION

One or more shortcomings of the conventional methods are overcome by the methods as claimed and additional advantages are provided through the provision of assembly as claimed in the present invention.

Additional features and advantages are realized through the techniques of the present invention. Other embodiments and aspects of the disclosure are described in detail herein and are considered as a part of the claimed disclosure.

In one non-limiting embodiment of the disclosure, a method of assembling a component is disclosed. The method includes providing a first element and a second element, inserting one or more alignment members at pre-defined positions in at least one of the first element or the second element, where the one or more alignment members is of a pre-defined shape. The method further includes positioning the one or more alignment members with a receiver portion other of the first element or the second element, along a joining portion. Further the method includes joining the first element and the second element, wherein, during joining, the one or more members align along a longitudinal axis of at least one of the first element and the second element.

In an embodiment of the disclosure, the one or more alignment members are beams.

In an embodiment of the disclosure, the one or more alignment members align along the longitudinal axis of at least one of the first element or the second element under the action of gravity.

In an embodiment of the disclosure, the pre-defined shape of the one or more alignment members is a pre-bent shape and the same aligns during joining due to the gravity.

In an embodiment of the disclosure, the component is a wind turbine blade, and the first element is a root-end element, and the second element is a tip-end element.

In an embodiment of the disclosure, the first element and the second element comprises a first aerodynamic shell and a second aerodynamic shell respectively that are tapered in thickness.

In an embodiment of the disclosure, the pre-defined position for inserting the one or more alignment members is a substantially central portion of at least one of the first element or the second element.

In an embodiment of the disclosure, the pre-defined position is a substantially central portion of the root-end element.

In an embodiment of the disclosure, the receiver portion is a housing defined in at least one of the first element or the second element to accommodate the one or more members.

In an embodiment of the disclosure, during joining, an over-lamination extending between at least one of a leading edge and a trailing edge of the first element or the second element is provided.

In an embodiment of the disclosure, the pre-defined positions for inserting the one or more alignment members include the leading edge and the trailing edge of at least one of the first element or the second element.

In an embodiment of the disclosure, the method includes the step of anchoring the tip-end element to facilitate alignment between the root-end element and the tip-end element during joining of the root-end element and the tip-end element.

In an embodiment of the disclosure, the one or more alignment members are retractable upon curing of the over-lamination.

In an embodiment of the disclosure, the first element and the second element are manufactured at different locations.

In another non-limiting embodiment of the disclosure, a component is disclosed. The component includes a first element, a second element and one or more alignment members inserted at pre-defined positions in one of the first element or the second element. The one or more members is of a pre-defined shape and the one or more members is aligned with a receiver portion of other of the first element or the second element along a joining portion and joining the first element and the second element. During joining, the one or more members align along a longitudinal axis of at least one of the first element and the second element.

In yet another non-limiting embodiment of the disclosure, a method for assembling a wind turbine blade is disclosed. The method includes providing a root end element of the wind turbine blade, providing a tip end element of the wind turbine blade, and inserting one or more alignment members at pre-defined positions in one of the root end elements, and the tip end element. The one or more alignment members is of a pre-defined shape. The method further includes positioning the one or more alignment members with a receiver portion of other of the root end element and the tip end element, along a joining portion. Then, joining the root end element and the tip end element wherein, during joining, the one or more alignment members align along a longitudinal axis of at least one of the root end elements and the tip end element.

It is to be understood that the aspects and embodiments of the disclosure described above may be used in any combination with each other. Several of the aspects and embodiments may be combined to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

DESCRIPTION OF THE INVENTION

Figure 2:
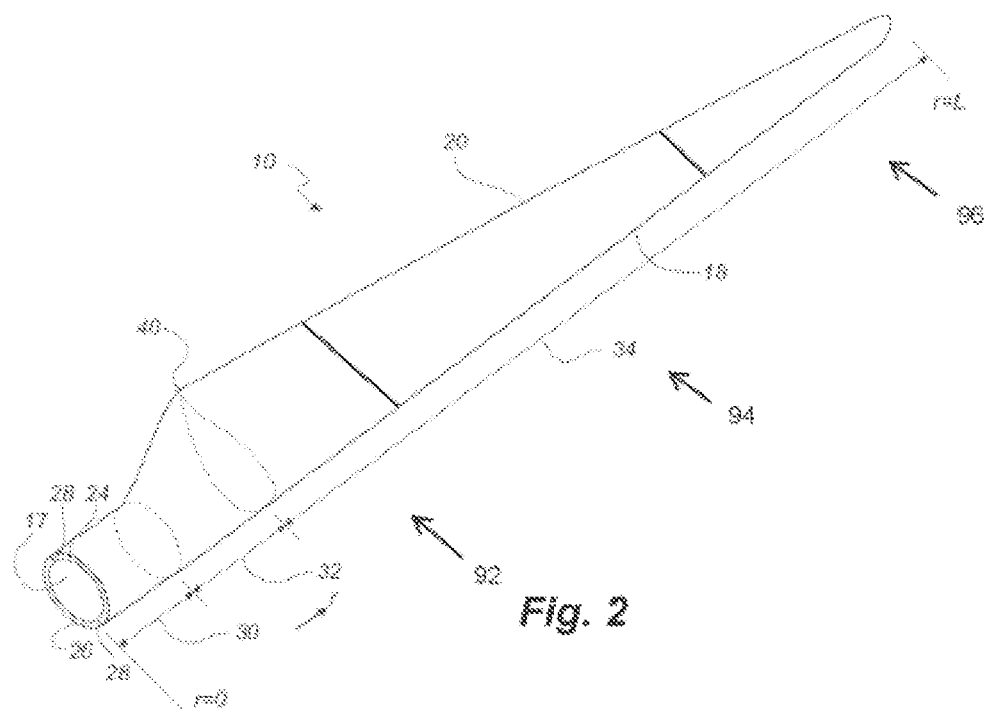
Figure 3:
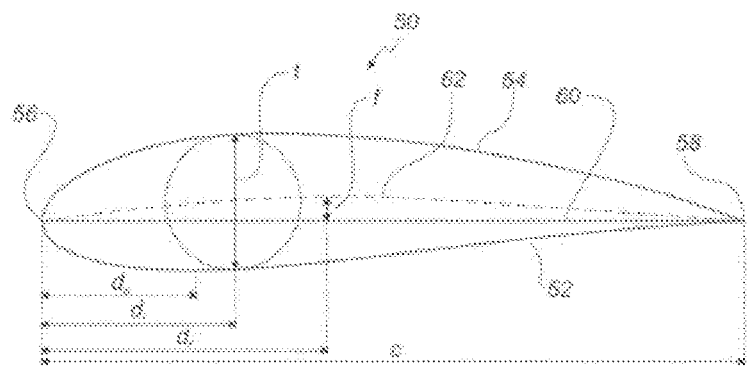
Figure 4:
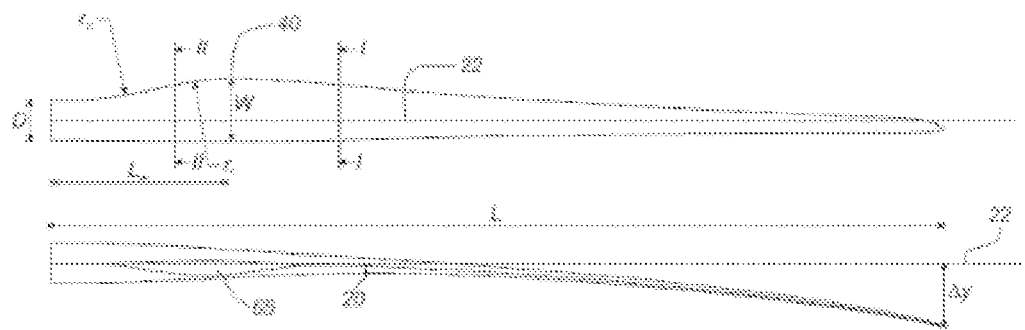
Figure 5:
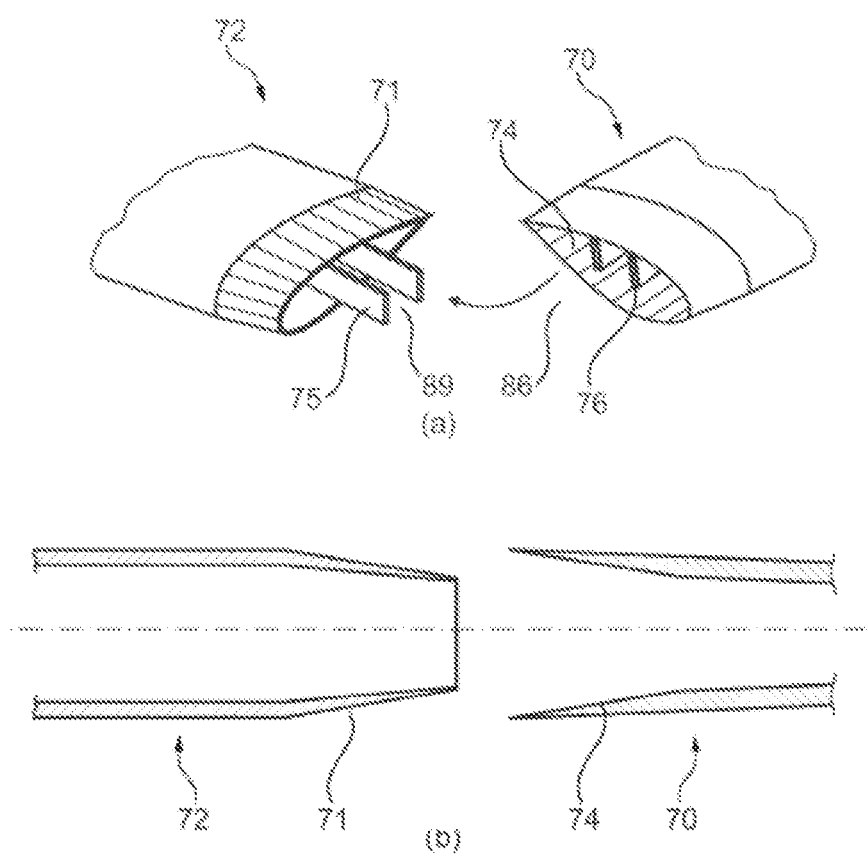
Figure 6:
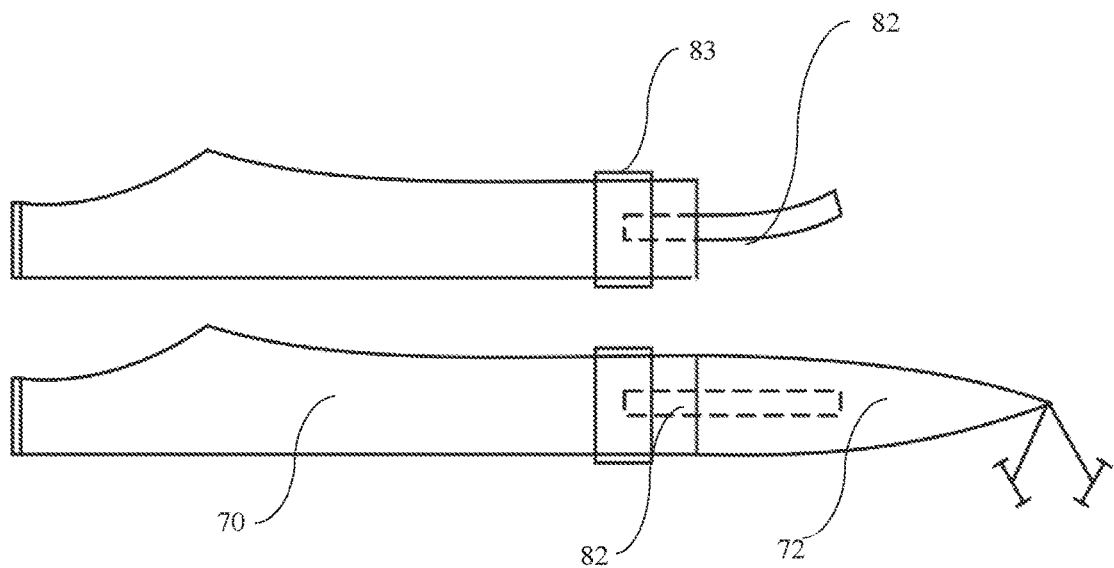
Figure 7:
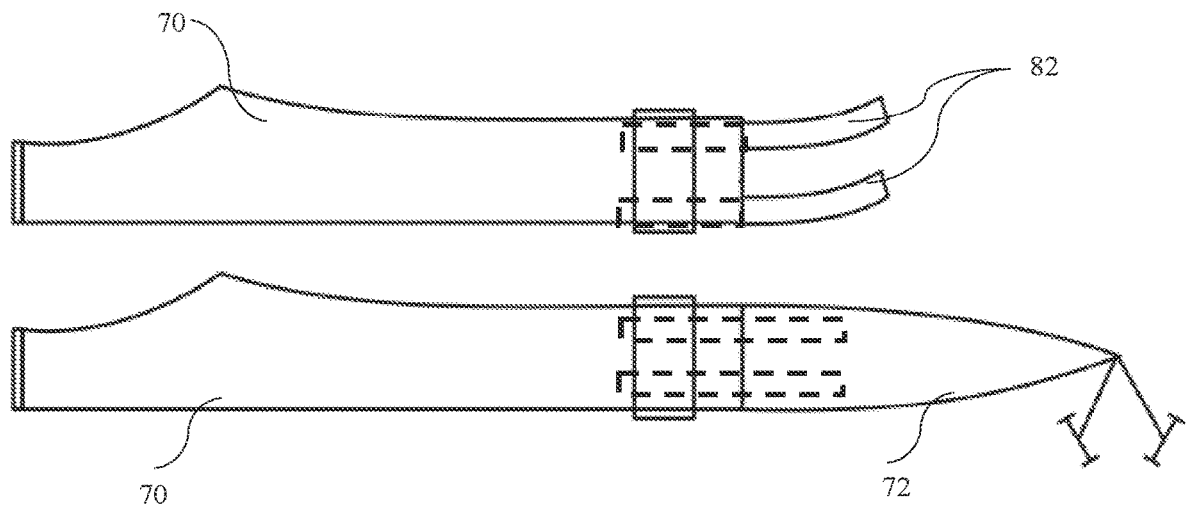

The invention is explained in detail below with reference to an embodiment shown in the drawings, in which FIG. 1 shows a wind turbine, FIG. 2 shows a schematic view of a wind turbine blade, FIG. 3 shows a schematic view of an airfoil profile though a section in the airfoil region of the blade, FIG. 4 shows a schematic view of a wind turbine blade seen from above and from the side, FIGS. 5(a) and (b) show schematic views of blade elements around the joint area, FIG. 6 shows the wind turbine blade with a pre-bent member provided in one of the elements of the wind turbine blade for aligning and assembling of the wind turbine blade, FIG. 7 shows the wind turbine blade with the one or more members provided at leading and trailing edges for assembling of the wind turbine blade.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit if the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a conventional modern upwind wind turbine 2 according to the so called "Danish concept" with a tower 4, a nacelle 6 and a rotor with a substantially horizontal rotor shaft. The rotor includes a hub 8 and three wind turbine blades 10 extending radially from the hub 8, each having a blade root 16 nearest the hub and a blade tip 14 furthest from the hub 8.

FIG. 2 shows a schematic view of a wind turbine blade 10 according to an embodiment of the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e., pre-bent), thus providing the chord plane with a correspondingly twisted and/or curved course, this being most often the case in order to compensate for the local velocity of the blade being dependent on the radius from the hub.

The blade is assembled from 3 elements 92, 94, 96. The elements are joined by the method according to the invention. FIGS. 3 and 4 depict parameters which are used to explain the geometry of the wind turbine blade according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side (or upwind side) 52 and a suction side (or downwind side) 54, which during use—i.e., during rotation of the rotor—normally face towards the windward side and the leeward side, respectively.

The airfoil 50 has a chord 60 with a chord length c extending between a leading edge 56 and a trailing edge 58 of the blade. The airfoil 50 has a thickness t, which is defined 30 as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position dr of the maximum camber f, the maximum airfoil thickness t, which is the largest diameter of the inscribed circles along the median camber line 62, the position dt of the maximum thickness t, and a nose radius (not shown). These parameters are typically defined as ratios to the chord length c. Thus, a local relative blade thickness t/c is given as the ratio between the local maximum thickness t and the local chord length c. Further, the position dp of the maximum pressure side camber may be used as a design parameter, and of course also the position of the maximum suction side camber.

FIG. 4 shows other geometric parameters of the blade. The blade has a total blade length L. As shown in FIG. 2, the root end is located at position r=0, and the tip end located at r=L. The shoulder 40 of the blade is located at a position r=Lw, and has a shoulder width W, which equals the chord length at the shoulder 40. The diameter of the root is defined as D. The curvature of the trailing edge of the blade in the transition region may be defined by two parameters, viz. a minimum outer curvature radius ro and a minimum inner curvature radius ri, which are defined as the minimum curvature radius of the trailing edge, seen from the outside (or behind the trailing edge), and the minimum curvature radius, seen from the inside (or in front of the trailing edge), respectively.

Further, the blade is optionally provided with a pre-bend, which is defined as $\lambda y$, which corresponds to the out of plane deflection from a pitch axis 22 of the blade.

FIGS. 5(a) and 5(b) show two elements 70, 72, of a wind turbine blade which can be joined according to the invention. A first element 70 has a first tapered surface 74 tapering around the inner circumference towards a first end 86 of the part forming a female tapered surface. A second element 72 has a second tapered surface 71 tapering around the outer circumference towards a second end 89 of the part forming a male tapered surface. The first element can receive the second element after alignment of the two elements.

FIG. 5(a) shows shear beams 75, 76. If necessary, these may be connected in various ways known in the art. Glue joints may typically be used, such as butt joints, taper joints, scarf joints and the like.

FIG. 5(b) shows a sectional side view of the two blade elements to be connected. In an embodiment, where the full blade length is consisting of only to blade elements, the first (male) element 70 is the tip-end element, and the second (female) element 72 is the root-end element, the tip-end element is made in a one-shot moulding process in a closed mould, while the root-end element is made by first manufacturing two half shells each in a separate mould. The half shells are then joined by adhering them to each other at the leading edge and trailing edge to form the root-end element. The one-shot process is known in the art and comprises steps of:

1) lay up of fabric on a lower mould surface,
2) including balsa and/or foam components,
3) provide inner mould components which could be made from any suitable material (wood, rubber, metal, air-filled bladder etc.),
4) lay up of further fabric on the inner mould components,
5) including further balsa and/or foam components
6) close the mould with an upper mould
7) infuse with resin and cure
8) de-mould the full tip-end element.

FIG. 6 shows an exemplary embodiment of the present disclosure of assembling a portion of the wind turbine blade 10. While the description is given here with respect to the wind turbine blade 10, the disclosure is not limited to the same. The invention may be extended to any component involving two element that may have to be assembled.

As shown in FIG. 6, the present disclosure is directed towards assembling the first element 70 and the second element 72. The first element 70 may be a root-end element of the wind turbine blade 10 and the second element 72 may be a tip-end element of the wind turbine blade 10. One or more alignment members 82 may be provided at a substantially central portion of either of the first element 70 or the second element 72. In an embodiment, the one or more alignment members 82 are provided at a substantially central portion of the root-end element 70 of the wind turbine blade 10. The second element 72 or the tip-end element of the wind turbine blade 10 may then be joined or assembled with the root-end element 70 to form the complete wind turbine blade 10. In an embodiment, each of the one or more alignment members 82 is an elongated beam extending in a spanwise direction of the wind turbine blade 10. The elongated beam is defined with a pre-bend of a defined curvature, starting from a substantially central portion of elongated beam. As apparent from FIG. 6, a portion of the elongated beam without a curvature is received in first element 70 and a tip portion of elongated beam extending from curvature is receivable by the second element 72. The elongated beam with a pre-bend of a defined curvature when inserted into the second element 72 facilitates alignment of the second element 72 with the first element 70. The pre-bend of the elongated beam attains a substantially straight profile due to the weight of the second element 72, and thereby aligns the second element 72 with the first element 70 for joining the second element 72 with the first element 70.

The first element 70 or the second element 72 may be defined with a housing or receiver section 83 to accommodate the one or more alignment members 82. The one or more alignment members 82 or beams may be of pre-defined shape. In an embodiment, the beams may be at least one of pre-bent, pre-twisted and the like. Further, during assembly, the tip end element 72 may be brought near the root end element 70 and alignment member 82 aligns along longitudinal axis of the wind turbine blade 10 due to gravity to allow assembly of the root end element 70 and the tip end element 72. Further, during joining of the root end element 70 and the tip end element 72, overlamination extending between at least one of a leading edge 18 and a trailing edge 20 of the root end element 70 and the tip end element 72 is provided. Also, the tip-end element 72 may be optionally anchored to a surface to facilitate alignment between the root-end element 70 and the tip-end element 72 during joining of the root-end element 70 and the tip-end element 72. Once the over lamination is cured and the root-end element 70 and the tip-end element 72 are joined, the one or more members may be optionally removed from the wind turbine blade 10.

Now referring to FIG. 7, assembling the root end element 70 and the tip end element 72 is shown in accordance with another embodiment. As shown in FIG. 7, the one or more alignment members 82 such as but not limited to beams may be provided at either ends of the at least one of the root end elements 70 and the tip end element 72. For example, one or more alignment members 82 may be mounted to the root end element 70, and the either sides of the root end element 70 corresponds to leading edge and trailing edge of the root end element 70. The second element 72 or the tip-end element of the wind turbine blade 10 may then be joined or assembled with the root-end element 70 to form the complete wind turbine blade 10.

The root end element 70 or the tip end element 72 may be defined with a housing or receiver section 83 to accommodate the one or more alignment members 82. The one or more members 82 may be of pre-defined shape. In an embodiment, the one or more alignment members may be at least one of pre-bent, pre-twisted and the like. Further, during assembly, the tip end element 72 may be brought near the root end element 70 and the one or more alignment members 82 aligns along longitudinal axis of the wind turbine blade 10 due to gravity and self-weight to allow assembly of the root end element 70 and the tip end element 72. Further, during joining of the root end element 70 and the tip end element 72, overlamination extending between at least one of a leading edge 18 and a trailing edge 20 of the root end element 70 and the tip end element 72 is provided. Also, the tip-end element 72 may be optionally anchored to a surface to facilitate alignment between the root-end element 70 and the tip-end element 72 during joining of the root-end element 70 and the tip-end element 72. Once the over lamination is cured and the root-end element 70 and the tip-end element 72 are joined, the one or more members 82 may be optionally removed from the wind turbine blade 10.

The invention is not limited to the embodiments described herein and may be modified or adapted without departing from the scope of the present invention.

LIST OF REFERENCE NUMERALS 2 wind turbine
4 tower
6 nacelle
8 hub
10 wind turbine blade
14 blade tip
16 blade root
18 leading edge
20 trailing edge
22 pitch axis
30 root region
32 transition region
34 airfoil region
40 shoulder I position of maximum chord
50 airfoil profile
52 pressure side
54 suction side
56 leading edge
58 trailing edge
60 chord
62 camber line I median line
70 first element
71 second tapered section
72 second element
74 second tapered section
75 and 76 shear beams
82 one or more alignment members
83 housing
86 and 89 first and second ends

The invention claimed is:

1. A method for assembling a component, comprising:
providing a first element of the component;
providing a second element of the component;
inserting a first end of an alignment member at a predefined position in one of the first or second elements such that the first end is aligned with a longitudinal axis of the first or second element, the alignment member having a predefined shape such that an opposite second end of the alignment member is angled away from the longitudinal axis of the first or second element in which the first end is inserted;
positioning the alignment member within a receiver portion of the other of the first or second elements along a joining portion such that a longitudinal axis of the other of the first or second element is initially aligned with the angled second end of the alignment member;
joining the first and second elements, wherein, during the joining, a force of gravity acting on the other of the first or second element in which the second end of the alignment member is positioned causes the alignment member to change shape and bring the longitudinal axis of each of the first and second elements into alignment with each other;
wherein the component is a wind turbine blade, and the first element is a root-end element, and the second element is a tip-end element of the wind turbine blade.

2. The method according to claim 1, wherein the alignment member comprises a beam.

3. The method according to claim 1, wherein the predefined shape of the alignment member is a bent shape.

4. The method according to claim 1, wherein the root-end element and the tip-end element comprise a first aerodynamic shell and a second aerodynamic shell, respectively, that are tapered in thickness.

5. The method according to claim 1, wherein the predefined position for inserting the alignment member is a substantially central portion of the root-end element.

6. The method according to claim 1, wherein during joining, an over-lamination extending between at least one of a leading edge and a trailing edge of the root-end element or the tip-end element is provided.

7. The method according to claim 6, wherein the predefined position for inserting the alignment member includes alignment of the leading edge and the trailing edge of the root-end and tip-end elements.

8. The method according to claim 1, further comprising anchoring the tip-end element to facilitate alignment between the root-end element and the tip-end element during joining of the root-end element and the tip-end element.

9. The method according to claim 1, wherein the predefined position is a substantially central portion of one or both of the first and second elements.

10. The method according to claim 1, wherein the receiver portion is a housing defined in one of the first or second elements configured to accommodate the alignment member.

11. The method according to claim 1, wherein the first element and the second element are manufactured at different locations and brought to a location for the joining.

12. A method for assembling a component, comprising:
providing a first element of the component;
providing a second element of the component;
inserting an alignment member at a predefined position in one of the first or second elements, the alignment member having a predefined shape;
positioning the alignment member within a receiver portion of the other of the first or second elements along a joining portion;
joining the first and second elements, wherein, during the joining, the alignment member aligns along a longitudinal axis of at least one of the first or second elements;
wherein the component is a wind turbine blade, and the first element is a root-end element, and the second element is a tip-end element of the wind turbine blade;
wherein during joining, an over-lamination extending between at least one of a leading edge and a trailing edge of the root-end element or the tip-end element is provided; and
wherein the alignment member is retractable upon curing of the over-lamination.

* * * * *